United States Patent [19]

Lowry et al.

[11] Patent Number: 5,553,141
[45] Date of Patent: * Sep. 3, 1996

[54] ENCRYPTION AND DECRYPTION (SCRAMBLING AND UNSCRAMBLING) OF VIDEO SIGNALS

[75] Inventors: John D. Lowry, Toronto; Keith Lucas, Oak Ridges, both of Canada

[73] Assignee: Scientific-Atlanta, Inc., Atlanta, Ga.

[ * ] Notice: The portion of the term of this patent subsequent to May 21, 2005, has been disclaimed.

[21] Appl. No.: 507,565

[22] Filed: Jun. 24, 1983

[30] Foreign Application Priority Data

Jul. 12, 1982 [GB] United Kingdom ............... 8220588

[51] Int. Cl.⁶ .................................................. H04N 7/167
[52] U.S. Cl. ........................... 380/14; 380/15; 380/19; 380/20
[58] Field of Search .................... 380/14, 15, 19, 380/20

[56] References Cited

U.S. PATENT DOCUMENTS

| | | | |
|---|---|---|---|
| 2,547,598 | 4/1951 | Roschke | 358/124 |
| 2,673,237 | 3/1954 | Reeves | 358/120 |
| 2,677,719 | 5/1954 | Reeves | 358/119 |

(List continued on next page.)

FOREIGN PATENT DOCUMENTS

| | | |
|---|---|---|
| 642144 | 6/1962 | Canada ............................... 358/119 |
| 735107 | 5/1966 | Canada . |
| 735108 | 5/1966 | Canada . |
| 750074 | 1/1967 | Canada . |
| 782707 | 4/1968 | Canada . |
| 983616 | 2/1976 | Canada . |
| 1010560 | 5/1977 | Canada . |
| 1088665 | 10/1980 | Canada . |
| 1089975 | 11/1980 | Canada . |
| 1089974 | 11/1980 | Canada . |
| 1095164 | 2/1981 | Canada . |
| 1103764 | 6/1981 | Canada . |
| 1068881 | 5/1967 | United Kingdom . |
| 1083744 | 9/1967 | United Kingdom . |
| 1083745 | 9/1967 | United Kingdom . |
| 1252332 | 11/1971 | United Kingdom . |
| 1353693 | 5/1974 | United Kingdom . |
| 1382558 | 2/1975 | United Kingdom . |

(List continued on next page.)

OTHER PUBLICATIONS

Okada et al, United Kingdom Patent Application 2,090,504, 7 Jul. 82.
Okada et al, United Kingdom Patent Application 2,090,505, 7 Jul. 82.
L. Bluestein, United Kingdom Patent Application 2,095,071, 22 Sep. 82.
Den Toonder et al, United Kingdom Patent Application 2,078,052, 23 Dec. 81.
H. Shutterly, European Patent Application 0,018,784, 12 Nov. 80.
H. Shutterly, European Patent Application 0,018,783, 12 Nov. 80.
H. Shutterly, Europeran Patent Application 0,018,782, 12 Nov. 80.
Den Toonder et al, United Kingdom Patent Application 2,078,051, 23 Dec. 81.
Den Toonder et al, United Kingdom Patent Application 2,077,547, 16 Dec. 81.
W. Cheung, United Kingdom Patent Application 2,042,846, 24 Sep. 80.
Fondse et al, United Kingdom Patent Application 2,038,137, 16 Jul. 80.

Primary Examiner—Stephen C. Buczinski
Attorney, Agent, or Firm—Banner & Allegretti, Ltd.

[57] ABSTRACT

A video signal is encrypted by pseudo-random variation of portions of lines thereof to be horizontally scanned that are devoid of video information. Thus, the durations of line blanking intervals may be varied. The variation is done in accordance with an encryption keys which is employed at the receiver to decrypt the encrypted video signal.

55 Claims, 5 Drawing Sheets

U.S. PATENT DOCUMENTS

| | | | |
|---|---|---|---|
| 2,920,009 | 2/1961 | Roschke . | |
| 2,961,481 | 11/1960 | Hammond, Jr. et al. | 358/119 X |
| 2,972,008 | 2/1961 | Ridenour et al. | 358/123 |
| 3,313,880 | 4/1967 | Bass | 358/120 |
| 3,460,161 | 8/1969 | Waller et al. | 358/120 |
| 3,485,941 | 12/1969 | Bass | 358/120 |
| 3,717,206 | 2/1973 | Zopf et al. | 358/123 |
| 3,735,027 | 5/1973 | Corwin et al. | 358/114 |
| 3,736,369 | 5/1973 | Vogelman | 3358/120 |
| 3,813,482 | 5/1974 | Blonder | 358/120 |
| 4,070,693 | 1/1978 | Shutterly | 358/123 |
| 4,319,273 | 3/1982 | Nossem | 358/120 |
| 4,325,079 | 4/1982 | Little | 358/120 |
| 4,338,628 | 7/1982 | Sherwood | 358/120 |
| 4,390,898 | 6/1983 | Bond et al. | 358/119 |
| 4,396,946 | 8/1983 | Bond | 358/119 |
| 4,594,609 | 6/1986 | Romao et al. . | |

FOREIGN PATENT DOCUMENTS

| | | |
|---|---|---|
| 1397412 | 6/1975 | United Kingdom . |
| 1503051 | 3/1978 | United Kingdom . |
| 1528273 | 10/1978 | United Kingdom . |
| 8102499 | 9/1981 | WIPO . |
| 8102961 | 10/1981 | WIPO . |
| 8103593 | 12/1981 | WIPO . |

ENCRYPTION AND DECRYPTION (SCRAMBLING AND UNSCRAMBLING) OF VIDEO SIGNALS

BACKGROUND OF THE INVENTION

This invention relates to methods and apparatus for encrypting (and decrypting) signals, particularly video signals, and is suited especially for use in cable and satellite video transmissions.

There exists a need for secure encryption of video signals, such that only designated users may decrypt and display the information.

In typical encryption systems, one or more parameters of the signal to be encrypted are modified according to a pattern which is determined at the transmitter. The pattern generally is a member of a large class of similar patterns, such that discovery of the pattern through exhaustive search is extremely unlikely. A precise description of the pattern used for encryption is delivered to designated receivers, which then are able to recover the original information. The description of the pattern is known conventionally as the 'encryption key'. The process of informing designated users of the encryption key is known conventionally as 'key distribution'.

This invention relates to the choice of parameters of the original video signal to be encrypted, and to the techniques and apparatus for implementing the encryption and decryption at low cost. The problem of key distribution is not dealt with herein. Conventional and well-known key distribution techniques can be employed.

BRIEF DESCRIPTION OF THE DRAWINGS

As it now will be necessary to refer to the drawings, these first will be described briefly as follows.

THE VIDEO SIGNAL

Figure 1:
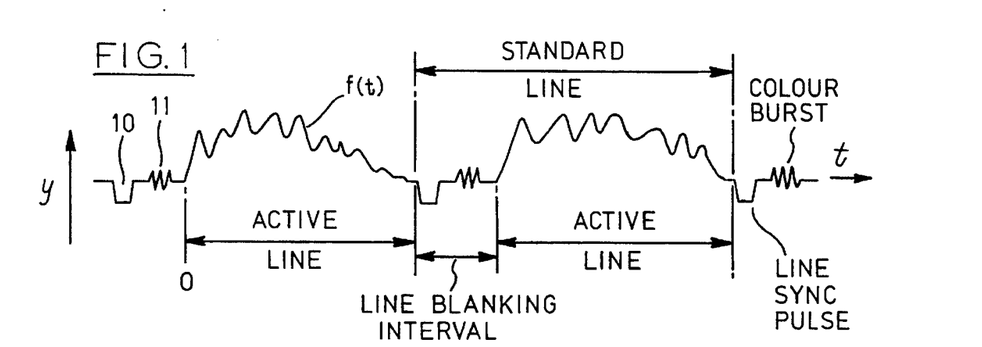
FIG. 1 shows a standard NTSC television signal.

Television signals are both produced and displayed as a result of a line scanning system. The picture material is scanned using a progressive series of horizontal lines which are transmitted sequentially in time. The transmitted signal is a continuous analogue of the brightness intensity corresponding to each point of the line. Such a signal is shown in FIG. 1, from which it may be seen that in a series of standard lines, any two adjacent active lines, during which video information is transmitted, are separated by a period in which no video information is transmitted. This latter period is known as the line blanking interval and is introduced to allow the scanning device in the receiver to reset to the line-start position.

In typical colour TV signals the active line period carries a single signal which simultaneously represents the instantaneous values of three colour components. The method by which the three independent signals are coded into one signal is standardised throughout North America, Canada and Japan, being known as the NTSC standard. Alternative standards (known as PAL and SECAM) have been adopted in other countries, but all of these have the same basic format, including a line-blanking interval, and an active line period.

New types of analogue video signals, which are particularly adapted to transmission by satellite or cable, and which lead to an improved picture quality in comparison with existing standards, are being studied. These are based on a time multiplex of the three independent signals during the active line. Instead of coding the three signals into one (using NTSC, PAL or SECAM), they are sent sequentially using a time-compression technique. One version of this type of signal is known as MAC (Multiplexed Analogue Components). These signals (in particular the MAC signal) also adhere to the same basic format, including a line-blanking interval, and an active line period. However, it should be noted that when a MAC signal is employed, digital data may be transmitted during the line blanking interval, as is shown by the dotted lines in FIGS. 2a and 2c. Therefore, speaking more generally, the standard line of a television signal may be separated into two components during one of which video information is transmitted and during the other of which no video information is transmitted. In the case of NTSC, PAL, SECAM or monochrome (black and white) television signals, the latter component is the line blanking interval, while, in the case of a MAC signal, it also may be a line blanking interval or, alternatively, a period of digital data transmission. It also is known, of course, in connection with an NTSC signal, for example, that line synchronizing signals and colour burst signals are transmitted during the line blanking interval, and these are shown at 10 and 11 respectively in FIG. 1. Variations also have been made to NTSC, PAL and SECAM signals in which data signals replace part of the line blanking interval.

ENCRYPTION TECHNIQUES

Referring to FIG. 1, let the signal during the active line period be represented by:

$$y=f(t) \text{ where } y=\text{amplitude (voltage)} \ t=\text{time}$$

Knowledge of both the signal amplitude (y) and the time at which it occurs (t) is necessary for accurate reconstruction of the video signal in a line scanned system.

Encryption techniques may be classified as follows:
(1) Those which modify the amplitude (y) of the transmitted signal according to a prescribed pattern.

$$Y'=g(f), \text{ where } f=f(t)$$

Examples include amplitude reversal of randomly chosen lines:

$$y'=g(f)=-f$$

(2) Those which modify the time at which the signal is transmitted through the channel:

$$y'=f(t')$$

Examples include the reordering of television lines according to a prescribed pattern:

$$y'=f(t-d)$$

(3) Those which modify both amplitude and transmission time.

It has been found that encryption techniques from the first category (variation of amplitude) cause impairments when the channel through which the signal is to be passed is non-linear. In this case an amplitude (y) will be represented in the scrambled channel by various amplitudes according to the scrambling function in use at that instant. A channel non-linearity therefore will cause imperfect reconstruction of the video information at the receiver. Since amplitude non-linearities are very common, it has been concluded that an optimum encryption algorithm should be selected from the second category, and, in particular, from the subset:

$$y'=f(t-d)$$

where d is constant during each standard line. In this case the channel is subjected to an undistorted signal, only the time at which the signal occurs being scrambled. Since almost all channels are essentially 'time invariant', this technique introduces few impairments. The system is known as time-base scrambling.

An obvious method of time-base scrambling which has been used, is to reorder the television lines within the picture. This method, which results when d in the previous equation is an integral number of line periods, is expensive, because recovery of the picture in the receiver demands storage of many television lines.

SUMMARY OF THE INVENTION

According to the instant invention there is provided a time-base scrambling method which can be implemented at low cost, requiring storage of as few as 1–3 television lines (or even less than one line) in the receiver depending upon the hardware employed.

Various aspects of the invention are as follows:

A method for encrypting a line-scanned television signal of a type wherein in each line there is a first period during which video information is present and a second period where no video information is present, which method comprises encrypting said television signal in accordance with an encryption key by varying the durations of at least some of said second periods to both increase and decrease the same in accordance with said encryption key, the extent of variations in the durations of said second periods being such that over a predetermined period of time the total of increases in said durations equals the total of decreases in said durations.

A method for encrypting a line-scanned television signal of a type wherein in each line there is a first period during which video information is present and a second period where no video information is present, transmitting the encrypted signal, receiving the encrypted signal, decrypting the encrypted signal and displaying the decrypted signal corresponding to said television signal before encryption, which method comprises encrypting said television signal in accordance with an encryption key by varying the durations of at least some of said second periods to both increase and decrease the same in accordance with said encryption key, the extent of variations in the durations of said second periods being such that over a predetermined period of time the total of increases in said durations equals the total of decreases in said durations; transmitting the encrypted signal; receiving the encrypted signal; providing a decryption key corresponding to said encryption key; decrypting said television signal in accordance with said decryption key by restoring the durations of said at least some second periods each to a duration equal to the length of said second period of said television signal prior to encryption; and supplying the decrypted television signal to a television receiver for display.

A method for decrypting a line-scanned television signal of a type wherein prior to encryption in each line there is a first period during which video information is present and a second period where no video information is present and wherein after encryption the durations of at least some of said second periods have been varied to both increase and decrease the same in accordance with an encryption key, the extent of variations in the durations of said second periods being such that over a predetermined period of time the total of increases in said durations equals the total of decreases in said durations, which method comprises decrypting said television signal using a decryption key corresponding to said encryption key by restoring the durations of said at least some second periods each to a duration equal to the duration of said second period of said television signal prior to encryption.

Encrypting apparatus for encrypting a television signal comprising means for providing a line-scanned television signal of a type wherein in each line there is a first period during which video information is present and a second period where no video information is present; means for providing an encryption key; and means including line storage means for encrypting said television signal in accordance with said encryption key by varying the durations of at least some of said second periods to both increase and decrease the same in accordance with said encryption key, the extent of variations in the durations of said second periods being such that over a predetermined period of time the total of increases in said durations equals the total of decreases in said durations.

Decrypting apparatus for decrypting an encrypted line-scanned television signal of a type wherein prior to encryption in each line there is a first period during which video information is present and a second period where no video information is present and wherein after encryption the durations of at least some of said second periods to both increase and decrease the same have been varied in accordance with an encryption key, the extent of variations in the durations of said second periods being such that over a predetermined period of time the total of increases in said durations equals the total of decreases in said durations, said apparatus comprising means for providing a decryption key corresponding to said encryption key; and means including line storage means for decrypting said television signal in accordance with said decryption key by restoring the durations of said at least some second periods each to a duration equal to the duration of said second period of said television signal prior to encryption. As used herein and in the claims the terminology active video and video information shall be construed as meaning picture information.

DETAILED DESCRIPTION OF THE INVENTING INCLUDING THE PREFERRED EMBODIMENT

Figure 2A:
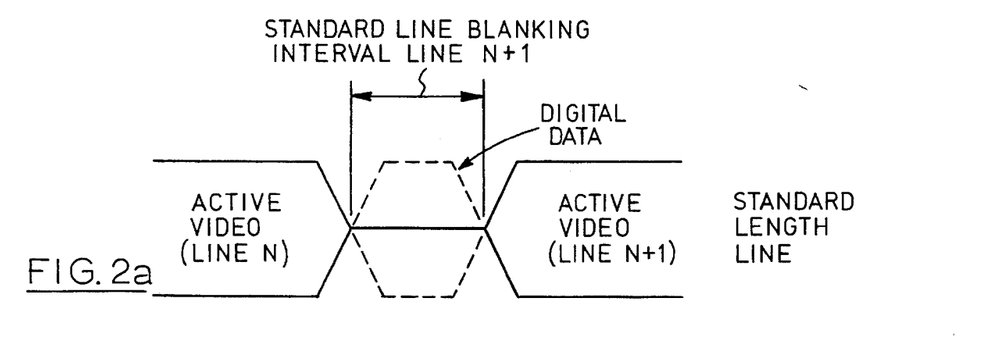
FIGS. 2a, 2b and 2c illustrate the encryption technique employed in the practice of an aspect of this invention and, in fact, illustrate the essence of the invention.
Figure 2B:
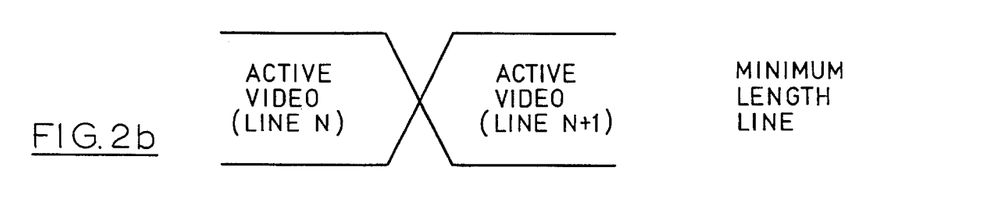
Figure 2C:
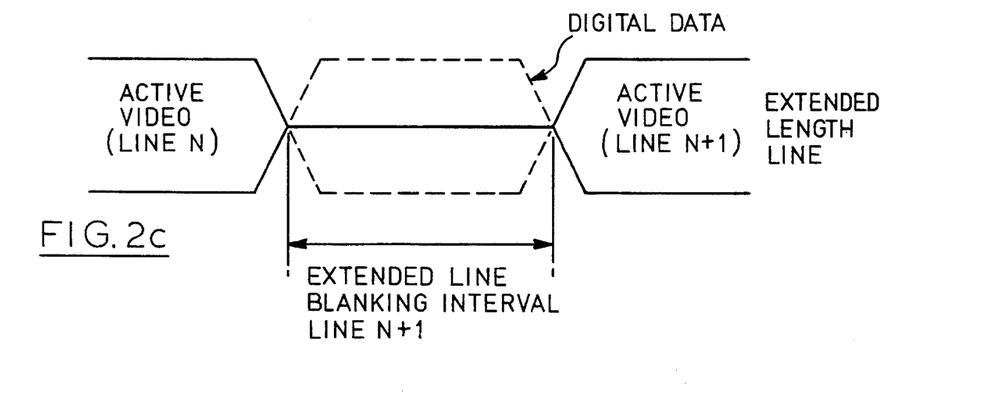

The method of the present invention is based on the derivation and use of a variable line period, as best shown in FIGS. 2a–2c.

Referring to FIG. 2a, portions of the active video components of lines N and N+1 are shown along with the line blanking interval of line N+1. The line shown in FIG. 2a is of standard length and thus includes a standard line blanking interval. As discussed previously, and as shown in dotted outline in FIG. 2a, instead of there being a line blanking interval, there may be a period of standard length for transmission of digital data.

A line of minimum length is shown in FIG. 2b and is obtained by virtually eliminating the standard line blanking interior the period of digital data transmission.

A line of extended length is shown in FIG. 2c and is obtained by increasing the standard line blanking interval or the period of digital data transmission shown in FIG. 2a, the dotted outline in FIG. 2c also indicating digital data.

An extended length line of the type shown in FIG. 2c can be derived with simple hardware in the case where the line blanking interval (hereafter reference only will be made to the line blanking interval, but it is understood that this equally well may be a period occupied by a digital data signal) is double the line blanking interval of FIG. 2a, and, in fact, the extended length line of FIG. 2c has twice the line blanking interval of the standard line of FIG. 2a.

Encryption is achieved according to an aspect of the present invention by varying the line blanking intervals of some of the lines to derive minimum and extended length lines, the transmitted television signal then being composed of lines of all three different lengths in accordance with an encryption key.

It will be appreciated that over some specified period of time it is necessary for the average line length to be equal to the length of a standard line, i.e., that the long and short lines must cancel or balance each other out. This period is not critical. It may be one field, for example, or one frame, or it may be even a longer period, but, the longer it is, the longer it will take for the receiver to lock-in.

While FIGS. 2a–2c illustrate a preferred embodiment of the invention where the line blanking interval is standard, zero and two times standard, line blanking intervals between zero and standard can be employed as well as line blanking intervals more than twice standard and/or between one and two times standard, and there may be a number of different line blanking intervals between zero and standard and a number of different line blanking intervals greater than standard. Generally speaking, however, employing a standard and more than two other line blanking intervals can be done only at the expense of more sophisticated hardware.

In another embodiment of the invention no standard length lines may be employed, i.e., the line blanking intervals of all lines will be lengthened or shortened.

Thus, in the practice of the present invention a television signal is modified in accordance with an encryption key to produce a television signal in which all active video lines are transmitted unchanged except for a time delay equal to the accumulated variance in the line blanking periods. More specifically, and as determined by the encryption key, some lines may be left with unchanged line blanking intervals, the line blanking intervals of other lines are increased, and the line blanking intervals of still other lines are decreased. The encrypted television signal is composed of all of these lines and is what is transmitted, the encryption key indicating which lines are standard lines, which long and which short, to enable decryption of the received signal.

One additional condition is required to ensure a low-cost receiver. This condition is that the accumulated change of the line blanking periods at any given time should remain within the range of from 0–1 line. With this constraint, the lines which arrive at the receiver do not require more than one line of delay before they are used in reconstructing the original signal, i.e., the signal prior to encryption. It is to be understood clearly, however, that this is not a limitation of the present invention. If the accumulated change in the line blanking periods at any given time will be more than one line, all that is required is to ensure that apparatus capable of storing the accumulated change is available, and this simply introduces greater cost and complexity.

Because certain of the line blanking periods have been completely or partially removed, it is necessary to regenerate the blanking waveforms in the receiver. This can be achieved simply using electronic memories. More specifically, in the case of an NTSC signal, for example, regeneration of the line blanking intervals will require regeneration of the line synchronizing signals and the colour burst signals. This can be done using prior art techniques, however, and is not a part of the present invention. Thus, once the decryption key, which is the same as the encryption key, has been employed to restore the active video components to their proper time relationship with respect to each other, sync and colour burst signals correctly timed with respect to the video signals can be added readily and by known means.

In the case where digital data is present during what would otherwise appear to be a line blanking interval, it might appear from FIG. 2b that the digital data would be lost by the practice of this invention. It will not be lost, however, but rather will be transmitted during longer than standard digital data periods, as shown in FIG. 2c, for example.

IMPLEMENTATION

The encryption/decryption technique previously described herein can be implemented in a large number of ways using known techniques, equipment and components. Thus, referring to FIG. 3, for example, the television signal produced by a TV camera 12 is supplied to an optional analogue to digital (ADC) converter 13, the digital output of which is supplied to a line storage device 14. The output of line storage device 14 is supplied to an optional digital to analogue converter (DAC) 15 whose output, which is an encrypted television signal in analogue form, is supplied to a transmitter 16 for broadcast to a satellite 17, for example. An encryption key for encrypting the television signal in line storage device 14 is supplied to encoding and timing networks 18 which vary the line blanking intervals of the television signal.

Figure 3:
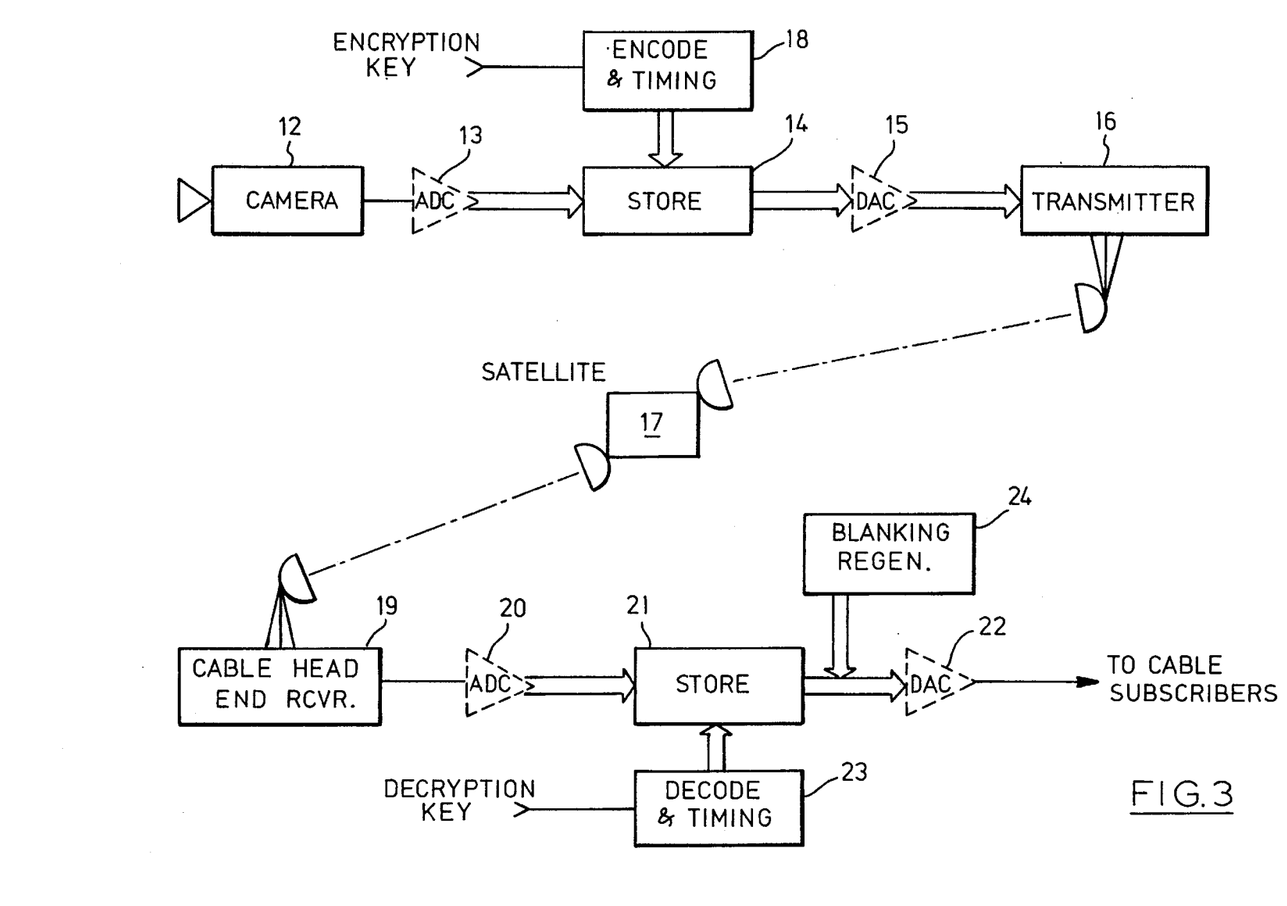
FIG. 3 shows one form of an encryption/decryption system embodying an aspect of the present invention.

The encrypted signal is received by a cable head end receiver 19 and supplied to an optional ADC 20 whose digital output is supplied to a line storage device 21. The output of line storage device 21 is supplied to an optional DAC 22 whose output, which is a decrypted TV signal the same in all respects as that derived at the output of camera 12, is supplied via cable to cable subscribers. A decryption key, which is the same as the encryption key, for decrypting the television signal in line storage device 21 is supplied to decoding and timing networks 23 which restore the shortened and extended line blanking intervals to the standard length shown in FIG. 2a.

In the case where the TV signal is an NTSC signal, for example, it may be necessary to restore line and field synchronizing signals and colour burst signals. This function is performed by blanking interval regenerating network 24.

The TV signal may be processed in either analogue or digital form. The nature of line storage devices 14 and 21 will depend upon the format of the signal. Thus, if the TV signal is in analogue form, line storage devices 14 and 21 may be so-called bucket-brigade devices, while, if the TV signal is in digital form, line storage devices 14 and 21 may be shift registers, a RAM with at least one line memory capacity or CCD storage devices.

Figure 4:
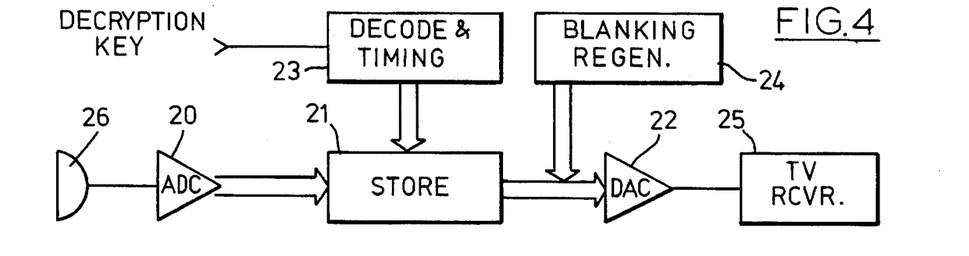
FIG. 4 shows an alternative receiving system to that shown in FIG. 3.

It will be understood that cable distribution of the TV signal after decryption is not essential to this invention. FIG. 4 discloses an arrangement whereby encrypted signals are received by an antenna 26 at a user location, e.g., a home, decrypted at that location and supplied to a TV receiver 25 at the location.

Figure 6:
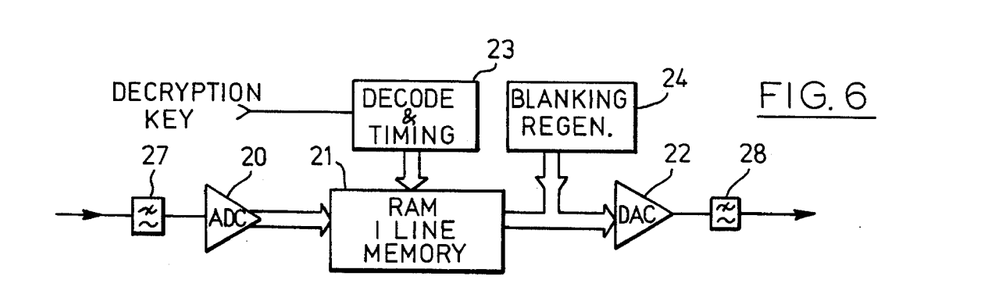
FIGS. 6 and 7 illustrate two different decryption systems each embodying different aspects of the invention.

One form of decryption system that can be used in practising the present invention is shown in FIG. 6, line storage device 21 in this case being a one line RAM memory. Components 27 and 28 simply are low pass filters. With the system of FIG. 6, read and write cycles occur independently during each TV line.

Figure 7:
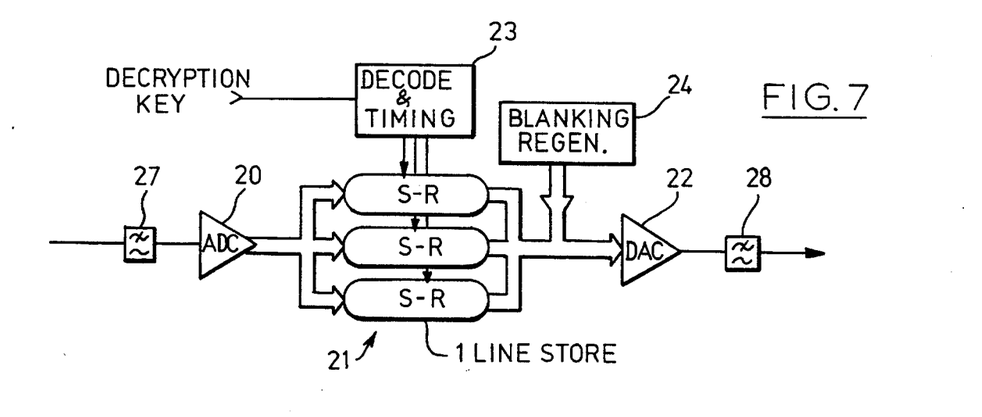

Another form of decryption system that can be used in practising the present invention is shown in FIG. 7, storage device 21 in this case being a number of shift registers. With the system of FIG. 7, the read-in and read-out cycles occur on different TV lines. The system of FIG. 7 also can be implemented using CCD technology.

Figure 5:
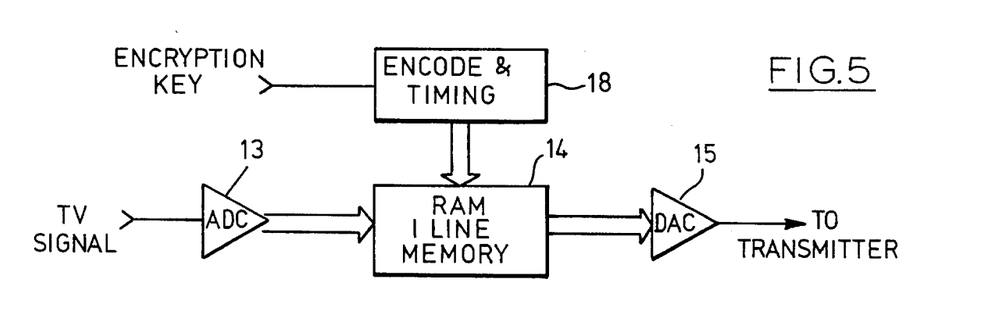
FIG. 5 illustrates an encryption system embodying an aspect of the invention.

An encryption system of a type paralleling the decryption system of FIG. 6 is shown in FIG. 5. Obviously an encryption system paralleling the decryption system of FIG. 7 also could be used and would be identical to that shown in FIG. 5 but with storage device 14 thereof being a plurality of shift registers connected as shown in FIG. 7.

Figure 8:
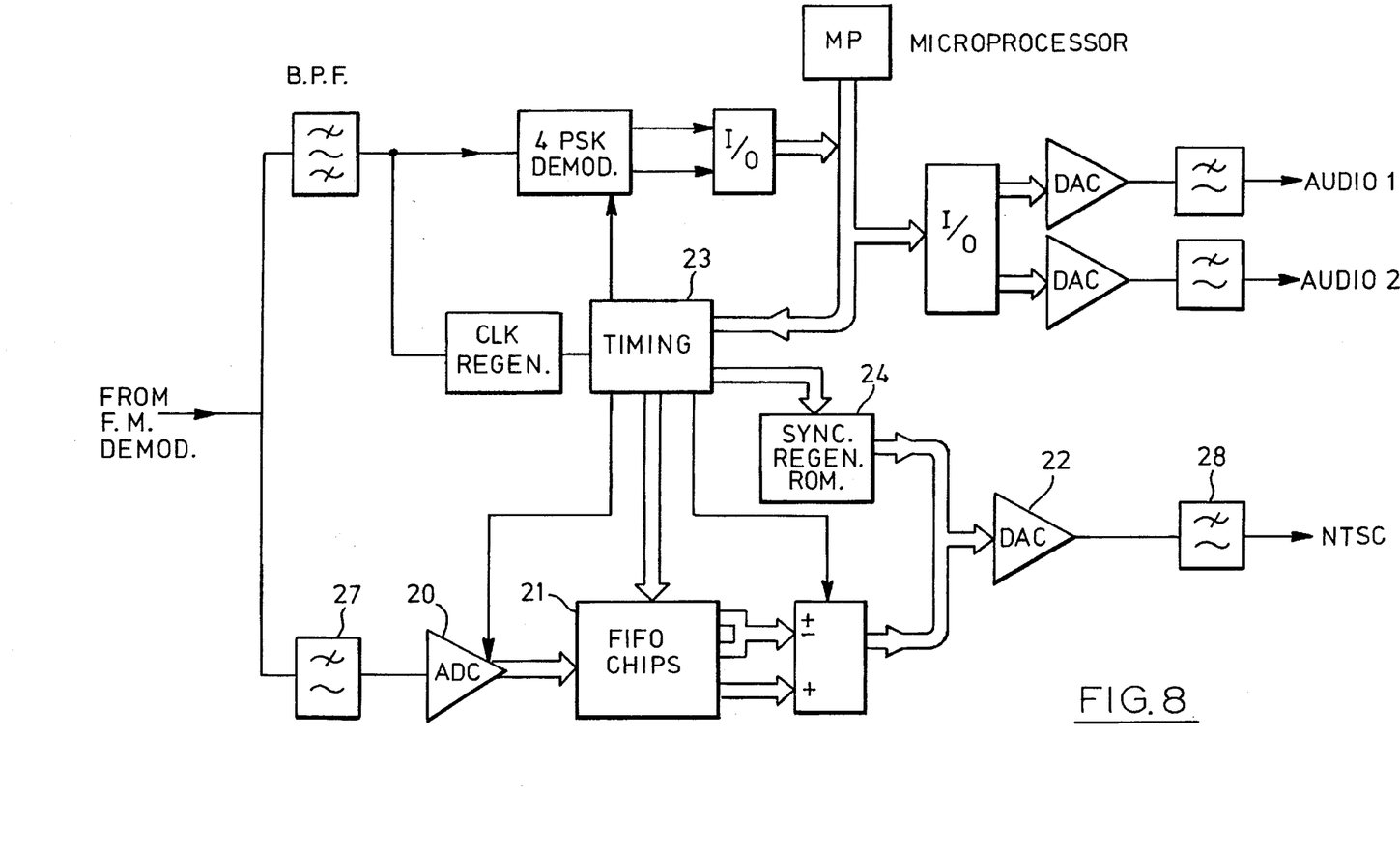
FIG. 8 shows a decryption system embodying an aspect of the invention and surrounding equipment.

FIG. 8 shows a decryption system embodying the present invention in somewhat greater detail.

Figure 9:
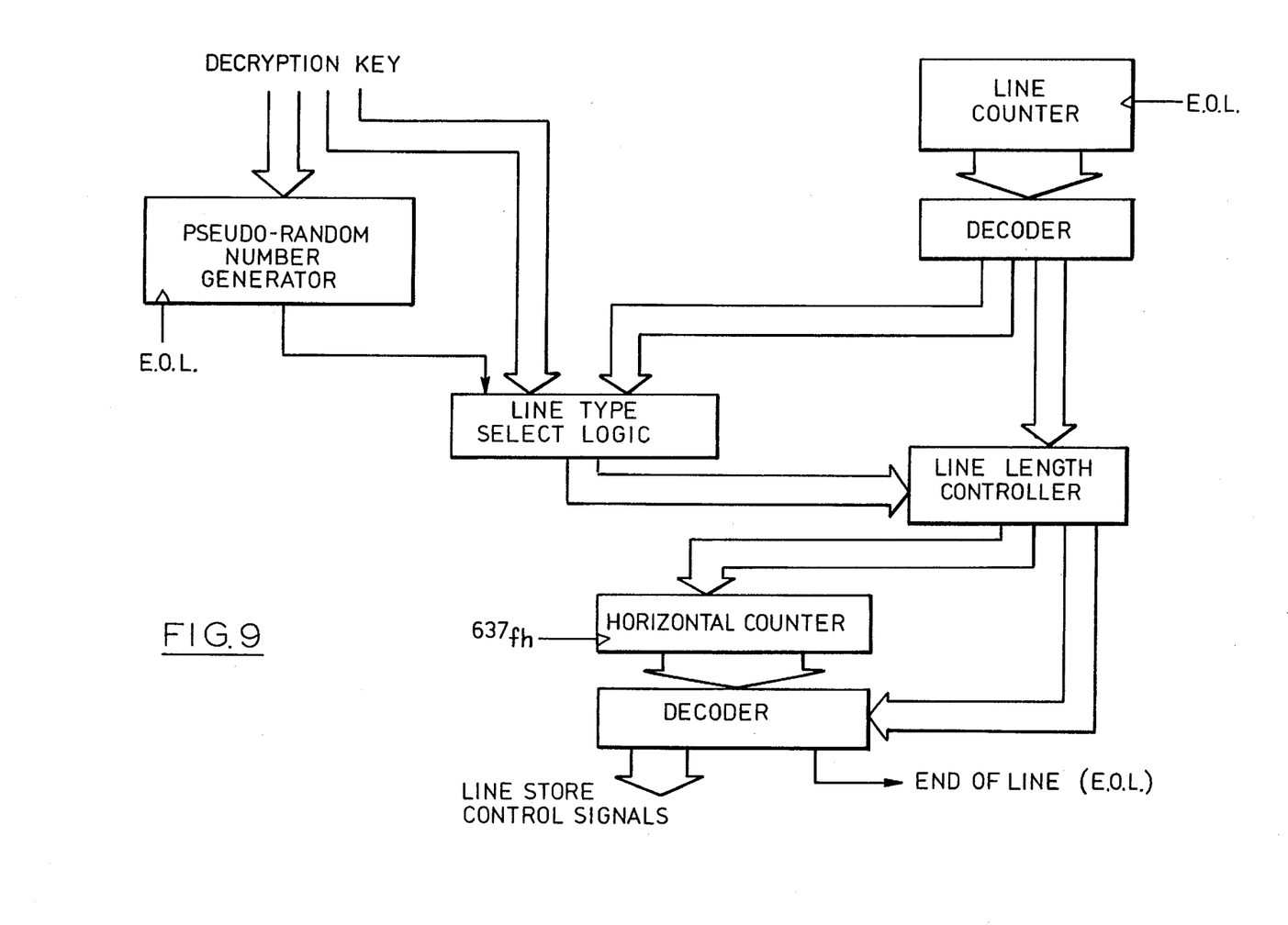
FIG. 9 illustrates apparatus that may be employed for the encryption and decryption of video signals by a technique embodying the present invention.

FIG. 9 shows how the decryption (or encryption) key is used to vary the line lengths. The decryption key (which, in the embodiment shown, is updated once a frame) is used as a starting vector for a pseudo-random number generator circuit. This circuit produces (for the NTSC case) a sequence of 525 random numbers based on the decryption key. These random numbers then are combined with information derived from a counter, which is incremented once per line, in a line type selection circuit. This circuit selects which type of line (i.e. determines the length of the blanking interval) for the next line. This information then is fed to the line length controller which monitors the aggregate deviation in line lengths referenced to the start of the current frame and ensures that for this particular embodiment the following two conditions are met:

1) The aggregate deviation never exceeds 1 full video line (63.55 μsec for NTSC);

2) The aggregate deviation at the end of the frame is zero.

The line length controller then provides information to the horizontal counter and its associated decoder which enable this counter/decoder to produce the correct line store control signals for the current line.

While a preferred embodiment has been described and illustrated herein, the person skilled in the art will appreciate that changes and modifications may be made therein without departing from the spirit and scope of this invention as defined in the appended claims.

We claim:
1. A method for encrypting a line-scanned television signal of a type wherein in each line there is a first period during which video information is present and a second period where no video information is present, which method comprises encrypting said television signal in accordance with an encryption key by varying the durations of at least some of said second periods to both increase and decrease the same in accordance with said encryption key, the extent of variations in the durations of said second periods being such that over a predetermined period of time the total of increases in said durations equals the total of decreases in said durations, and during at least some of said second periods synchronization information necessary for faithful reproduction of the television signal is removed, wherein said second periods are line blanking intervals.

2. A method according to claim 1 wherein some of said line blanking intervals remain unchanged in duration.

3. A method according to claim 2 wherein over said period of time the average duration of said line blanking intervals is the same as the duration of the line blanking interval of each line of the television signal before encryption.

4. A method according to claim 3 wherein at any time the accumulated change in the duration of the line blanking intervals of the encrypted signal is up to the duration of one line of the television signal before encryption.

5. A method according to claim 3 wherein said period of time is a field.

6. A method according to claim 3 wherein said period of time is a frame.

7. A method according to claim 4 wherein said period of time is a field.

8. A method according to claim 4 wherein said period of time is a frame.

9. A method for encrypting a line-scanned television signal of a type wherein in each line there is a first period during which video information is present and a second period where no video information is present, transmitting the encrypted signal, receiving the encrypted signal, decrypting the encrypted signal and displaying the decrypted signal corresponding to said television signal before encryption, which method comprises encrypting said television signal in accordance with an encryption key by varying the durations of at least some of said second periods to both increase and decrease the same in accordance with said encryption key, the extent of variations in the durations of said second periods being such that over a predetermined period of time the total of increases in said durations equals the total of decreases in said durations, and during at least some of said second periods synchronization information necessary for faithful reproduction of the television signal is removed; transmitting the encrypted signal; receiving the encrypted signal; providing a decryption key corresponding to said encryption key; decrypting said television signal in accordance with said decryption key by restoring the durations of said at least some second periods each to a duration equal to the duration of said second period of said television signal prior to encryption, the synchronization information due to its predetermined or known repetitive form being created and inserted as part of the decrypted television signal; and supplying the decrypted television signal to a television receiver for display, wherein said second periods are line blanking intervals.

10. A method according to claim 9 wherein some of said line blanking intervals remain unchanged in duration.

11. A method according to claim 10 wherein over said period of time the average duration of said line blanking intervals is the same as the duration of the line blanking interval of each line of the television signal before encryption.

12. A method according to claim 11 wherein at any time the accumulated change in the duration of the line blanking intervals of the encrypted signal is up to the duration of one line of the television signal before encryption.

13. A method according to claim 11 wherein said period of time is a field.

14. A method according to claim 11 wherein said period of time is a frame.

15. A method according to claim 12 wherein said period of time is a field.

16. A method according to claim 12 wherein said period of time is a frame.

17. A method for decrypting a line-scanned television signal of the type wherein prior to encryption in each line there is a first period during which video information is present and a second period where no video information is present and wherein after encryption the durations of at least some of said second periods have been varied to both increase and decrease the same in accordance with an encryption key, the extent of variations in the durations of said second periods being such that over a predetermined period of time the total of increases in said durations equals the total of decreases in said durations, and during at least some of said second periods synchronization information necessary for faithful reproduction of the television signal is removed, which method comprises decrypting said television signal using a decryption key corresponding to said encryption key by restoring the durations of said at least some second periods each to a duration equal to the duration of said second period of said television signal prior to encryption, the synchronization information due to its predetermined or known repetitive form being created and inserted as part of the decrypted television signal, wherein said second periods are line blanking intervals.

18. A method according to claim 17 wherein some of said line blanking intervals remain unchanged in duration.

19. A method according to claim 18 wherein over said period of time the average duration of said line blanking intervals is the same as the duration of the line blanking interval of each line of the television signal before encryption.

20. A method according to claim 19 wherein at any time the accumulated change in the duration of the line blanking intervals of the encrypted signal is up to the duration of one line of the television signal before encryption.

21. A method according to claim 19 wherein said period of time is a field.

22. A method according to claim 19 wherein said period of time is a frame.

23. A method according to claim 20 wherein said period of time is a field.

24. A method according to claim 20 wherein said period of time is a frame.

25. Encrypting apparatus for encrypting a television signal comprising means for providing a line-scanned television signal of a type wherein in each line there is a first period during which video information is present and a second period where no video information is present; means for providing an encryption key; and means including line storage means for encrypting said television signal in accordance with said encryption key by varying the durations of at least some of said second periods to both increase and decrease the same in accordance with said encryption key, the extent of variations in the durations of said second periods being such that over a predetermined period of time the total of increases in said durations equals the total of decreases in said durations, and during at least some of said second periods synchronization information necessary for faithful reproduction of the television signal is removed, wherein said second periods are line blanking intervals.

26. Encrypting apparatus for encrypting a television signal comprising means for providing a line-scanned television signal of a type wherein in each line there is a first period during which video information is present and a second period where no video information is present; means for providing an encryption key; and means including storage means for encrypting said television signal in accordance with said encryption key by varying the durations of at least some of said second periods to both increase and decrease the same in accordance with said encryption key, the extent of variations in the durations of said second periods being such that over a predetermined period of time the total of increases in said durations equals the total of decreases in said durations, and during at least some of said second periods synchronization information necessary for faithful reproduction of the television signal is removed, wherein said line storage means comprises RAM memory.

27. Encrypting apparatus for encrypting a television signal comprising means for providing a line-scanned television signal of a type wherein in each line there is a first period during which video information is present and a second period where no video information is present; means for providing an encryption key; and means including line storage means for encrypting said television signal in accordance with said encryption key by varying the durations of at least some of said second periods to both increase and decrease the same in accordance with said encryption key, the extent of variations in the durations of said second periods being such that over a predetermined period of time the total of increases in said durations equals the total of decreases in said durations, and during at least some of said second periods synchronization information necessary for faithful reproduction of the television signal is removed, wherein said line storage means comprises a plurality of shift registers.

28. Decrypting apparatus for decrypting an encrypted line-scanned television signal of a type wherein prior to encryption in each line there is a first period during which video information is present and a second period where no video information is present and wherein after encryption the durations of at least some of said second periods to both increase and decrease the same have been varied in accordance with an encryption key, the extent of variations in the durations of said second periods being such that over a predetermined period of time the total of increases in said durations equals the total of decreases in said durations, and during at least some of said second periods synchronization information necessary for faithful reproduction of the television signal is removed, said apparatus comprising means for providing a decryption key corresponding to said encryption key; and means including line storage means for decrypting said television signal in accordance with said decryption key by restoring the durations of said at least some second periods each to a duration equal to the duration of said second period of said television signal prior to encryption and the synchronization information due to its predetermined or known repetitive form being created and inserted as part of the decrypted television signal, wherein said second periods are line blanking intervals.

29. Decrypting apparatus for decrypting an encrypted line-scanned television signal of a type wherein prior to encryption in each line there is a first period during which video information is present and a second period where no video information is present and wherein after encryption the durations of at least some of said second periods to both increase and decrease the same have been varied in accordance with an encryption key, the extent of variations in the durations of said second periods being such that over a predetermined period of time the total of increases in said durations equals the total of decreases in said durations, and during at least some of said second periods synchronization information necessary for faithful reproduction of the television signal is removed, said apparatus comprising means for providing a decryption key corresponding to said encryption key; and means including line storage means for decrypting said television signal in accordance with said decryption key by restoring the durations of said at least some second periods each to a duration equal to the duration of said second period of said television signal prior to encryption and the synchronization information due to its predetermined or known repetitive form being created and inserted as part of the decrypted television signal, wherein said line storage means comprises RAM memory.

30. Decrypting apparatus for decrypting an encrypted line-scanned television signal of a type wherein prior to encryption in each line there is a first period during which video information is present and a second period where no video information is present and wherein after encryption the durations of at least some of said second periods to both increase and decrease the same have been varied in accordance with an encryption key, the extent of variations in the durations of said second periods being such that over a predetermined period of time the total of increases in said durations equals the total of decreases in said durations, and during at least some of said second periods synchronization information necessary for faithful reproduction of the television signal is removed, said apparatus comprising means for providing a decryption key corresponding to said encryption key; and means including line storage means for decrypting said television signal in accordance with said decryption key by restoring the durations of said at least some second periods each to a duration equal to the duration of said second period of said television signal prior to encryption and the synchronization information due to its predetermined or known repetitive form being created and inserted as part of the decrypted television signal, wherein said line storage means comprises a plurality of shift registers.

31. Decrypting apparatus for decrypting an encrypted line-scanned television signal of a type wherein prior to encryption in each line there is a first period during which video information is present and a second period where no video information is present and wherein after encryption the durations of at least some of said second periods to both increase and decrease the same have been varied in accordance with an encryption key, the extent of variations in the durations of said second periods being such that over a predetermined period of time the total of increases in said durations equals the total of decreases in said durations, said apparatus comprising means for providing a decryption key corresponding to said encryption key; and means including line storage means for decrypting said television in accordance with said decryption key by restoring the durations of said at least some second periods each to a duration equal to the duration of said second period of said television signal prior to encryption wherein said decryption apparatus further includes means for adding to said restored second periods line and field synchronizing signals and colour burst signals.

32. A method of scrambling a composite television video signal having intervals containing video information separated by horizontal synchronization pulses the method comprising shifting in time according to a predetermined scheme at least some portions of the composite television signal in a manner to eliminate at least some horizontal synchronization pulses between adjacent intervals containing video information.

33. A method of scrambling a composite television video signal as claimed in claim 32 wherein at least some adjacent intervals containing video information in the scrambled television signal are separated by a time duration of zero.

34. A method of scrambling a composite television video signal as claimed in claim 32 wherein the minimum amount of time a portion is shifted essentially equals the duration separating the intervals containing video information of the composite television video signal.

35. A method of scrambling a composite television video signal as claimed in claim 32 wherein the minimum amount of time a portion is shifted essentially equals the duration of a front porch and a horizontal synchronization pulse of the composite television signal.

36. A method for scrambling a composite television video signal having a sequence of intervals containing video information separated by intervals containing horizontal synchronization information necessary for reception by a television of a predetermined or known repetitive form, the method comprising processing the composite television signal to provide a scrambled television signal containing essentially all the video information of the composite television signal and omitting at least some of the horizontal synchronization information of the composite television signal necessary for reception, wherein at least some of the intervals containing video information in said scrambled television signal are separated by intervals having a duration less than the duration of the intervals separating the intervals containing video information of the composite television signal, wherein said processing is accomplished by shifting in time according to a predetermined scheme at least some portions of the composite television signal, and wherein said step of shifting is controlled to allow said scrambled television signal to be subsequently processed to provide a signal substantially corresponding to the composite television signal by creating and inserting any necessary horizontal synchronization information that has been omitted.

37. A method for scrambling a composite television video signal having a sequence of augmented picture portions including a back porch and a line of video information separated by intervals having a front porch and a horizontal synchronization pulse, the method comprising processing the composite television signal to produce a scrambled television signal containing essentially all the augmented picture portions of the composite television signal and omitting at least some of the horizontal synchronization pulses of the composite television signal, wherein at least some of the augmented picture portions in said scrambled television signal are separated by intervals having a duration less than the duration of the intervals separating the augmented picture portions of the composite television signal, wherein said processing is accomplished by shifting in time according to a predetermined scheme at least some portions of the augmented picture portions of the composite television signal, wherein said step of shifting is controlled to allow said scrambled television signal to be subsequently processed to provide a signal substantially corresponding to the composite television video signal by shifting of the video information and creating and inserting the necessary synchronization information omitted during scrambling of the signal.

38. A method for scrambling a composite television video signal as claimed in claim 37 wherein the augmented picture portions include a colour burst portion and said scrambled television signal contains essentially all of said colour burst portions.

39. A method of scrambling a composite television video signal having vertical blanking intervals separated by a sequence of lines of video information which are separated by horizontal synchronization intervals each containing a horizontal synchronization pulse, said method comprising shifting in time according to a predetermined scheme to decrease the time duration between at least some portions of the composite signal by an amount at least equal to the duration of a horizontal synchronization pulse and in a manner to eliminate at least some horizontal synchronization pulses, said shifting being controlled such that essentially any shifted portions contain complete lines of video information and no overlap of lines of video information in the scrambled signal occurs, whereby the scrambled signal requires the shifting of at least some of the lines of video information to re-establish the time duration between adjacent video portions to that as essentially found in the composite signal to allow insertion of any necessary horizontal synchronization pulses to effect unscrambling.

40. A method of scrambling a composite television video signal having intervals containing video information separated by horizontal synchronization pulses the method comprising processing the composite signal to effect removal of the horizontal synchronization pulses from between at least some of the adjacent video information and to shift such adjacent video information relative to each other to at least decrease the time duration therebetween such that video information at least occupies the space from which a horizontal synchronization pulse has been removed.

41. A method of scrambling a composite television video signal according to claim 40, wherein the processing of the composite signal includes passing the composite signal on occasion according to a predetermined scheme through time delay means to produce portions of the scrambled signal generally corresponding to the composite signal and having a time shift relative thereto.

42. A method of scrambling a composite television video signal according to claim 41, wherein said predetermined scheme is such that the time shift between a portion of the scrambled signal delayed relative to an adjacent following portion is less than or equal to the time duration of a synchronization pulse and front porch and greater than the time duration of a horizontal synchronization pulse.

43. A method of scrambling a composite television video signal having intervals containing video information separated by horizontal synchronization pulses, the method comprising processing the composite signal to shift according to a predetermined scheme at least some adjacent video information to at least decrease the time duration therebetween by an amount at least substantially equal to the duration of a horizontal synchronization pulse by eliminating a portion of the signal which need not be transmitted to allow at least substantially faithful reproduction of the composite signal upon unscrambling.

44. A method of scrambling a composite television video signal as claimed in claim 43, wherein the eliminated portion includes a horizontal synchronization pulse which due to its predetermined or known repetitive form can be created and inserted in accordance with timing information during unscrambling of the signal.

45. A method of scrambling a composite television video signal as claimed in claim 43, wherein horizontal synchronization pulses and associated front porches are eliminated which due to their predetermined or known repetitive form can be created and inserted in accordance with timing information during unscrambling of the signal.

46. Apparatus for scrambling a composite television video signal having intervals containing video information separated by horizontal synchronization pulses comprising means for shifting in time some portions of the composite television signal and control means for controlling said shifting means according to a predetermined scheme to produce a scrambled television signal in which at least some horizontal synchronization pulses between adjacent intervals containing video information are eliminated while maintaining substantially all of the video information.

47. A method of scrambling a composite television signal having intervals containing video information separated by intervals containing synchronization information necessary for faithful reproduction by a television and of a predetermined or known repetitive form, said method comprising processing the signal to eliminate at least some of the synchronization information necessary for faithful reproduction by a television between adjacent video information and shifting such adjacent video information to decrease the time duration therebetween by a duration substantially equal to the duration of the eliminated necessary synchronization information, which, due to its predetermined or known repetitive form can be created and inserted during unscrambling as required to allow substantially faithful reproduction of the composite signal.

48. A method as claimed in claim 47 wherein said step of shifting is controlled to maintain the order and integrity of substantially all of the video information and horizontal synchronization information is eliminated.

49. A method as claimed in claim 47 wherein the signal is processed to eliminate at least some horizontal synchronization pulses.

50. Apparatus for scrambling a composite television video signal having intervals containing video information separated by intervals containing synchronization information necessary for faithful reproduction by a television and of a predetermined or known repetitive form, said apparatus comprising means for processing the signal to eliminate at least some of the synchronization information necessary for faithful reproduction by a television between adjacent video information and means for shifting such adjacent video information to decrease the time duration therebetween by a duration substantially equal to the duration of the eliminated necessary synchronization information, which, due to its predetermined or known repetitive form can be created and inserted during unscrambling as required to allow substantially faithful reproduction of the composite video signal.

51. Apparatus as claimed in claim 50 including means for controlling said shift means whereby horizontal synchronization information is eliminated.

52. A method of scrambling a composite television video signal having intervals containing video information separated by horizontal synchronization pulses the method comprising shifting in time according to a predetermined scheme at least some portions of the composite television signal in a manner to eliminate at least some horizontal synchronization pulses between adjacent intervals containing video information, wherein said step of shifting is controlled such that a number of horizontal synchronization pulses precede and a number of horizontal synchronization pulses follow each vertical blanking interval and the time duration thereof remains unchanged for use by a receiver in unscrambling of the signal.

53. A method of scrambling a composite television video signal having vertical blanking intervals separated by a sequence of lines of video information which are separated by horizontal synchronization intervals each containing a horizontal synchronization pulse, said method comprising shifting in time according to a predetermined scheme to decrease the time duration between at least some portions of the composite signal by an amount at least equal to the duration of a horizontal synchronization pulse and in a manner to eliminate at least some horizontal synchronization pulses, said shifting being controlled such that essentially any shifted portions contain complete lines of video information and no overlap of lines of video information in the scrambled signal occurs, whereby the scrambled signal requires the shifting of at least some of the lines of video information to re-establish the time duration between adjacent video portions to that as essentially found in the composite signal to allow insertion of any necessary horizontal synchronization pulses to effect unscrambling, wherein the scrambled signal has a number of horizontal synchronization pulses preceding and following each vertical blanking interval having the same time relation as found in the composite signal to provide timing information used during the unscrambling of the signal.

54. A method of scrambling a composite television video signal having vertical blanking intervals separated by a sequence of lines of video information which are separated by horizontal synchronization intervals each containing a horizontal synchronization pulse, said method comprising shifting in time according to a predetermined scheme to decrease the time duration between at least some portions of the composite signal by an amount at least equal to the duration of a horizontal synchronization pulse and in a manner to eliminate at least some horizontal synchronization pulses, said shifting being controlled such that essentially any shifted portions contain complete lines of video information and no overlap of lines of video information in the scrambled signal occurs, whereby the scrambled signal requires the shifting of at least some of the lines of video information to re-establish the time duration between adjacent video portions to that as essentially found in the composite signal to allow insertion of any necessary horizontal synchronization pulses to effect unscrambling, said method including from time to time inserting digital data into the scrambled signal for portions of the composite signal which need not be transmitted to allow essentially faithful reproduction of the composite signal upon unscrambling.

55. A method of scrambling a composite television video signal having intervals containing video information separated by horizontal synchronization pulses, the method comprising processing the composite signal to shift according to a predetermined scheme at least some adjacent video information to at least decrease the time duration therebetween by an amount at least substantially equal to the duration of a horizontal synchronization pulse by eliminating a portion of the signal which need not be transmitted to allow at least substantially faithful reproduction of the composite signal upon unscrambling, wherein said step of shifting is controlled such that a number of horizontal synchronization pulses precede and a number of horizontal synchronization pulses follow each vertical blanking interval and the time duration thereof remains unchanged for use by a receiver in unscrambling of the signal.

* * * * *